T. A. WILLARD.
METHOD OF MAKING STORAGE BATTERY CONTAINERS.
APPLICATION FILED FEB. 11, 1921.
1,421,748.
Patented July 4, 1922.
2 SHEETS—SHEET 1.
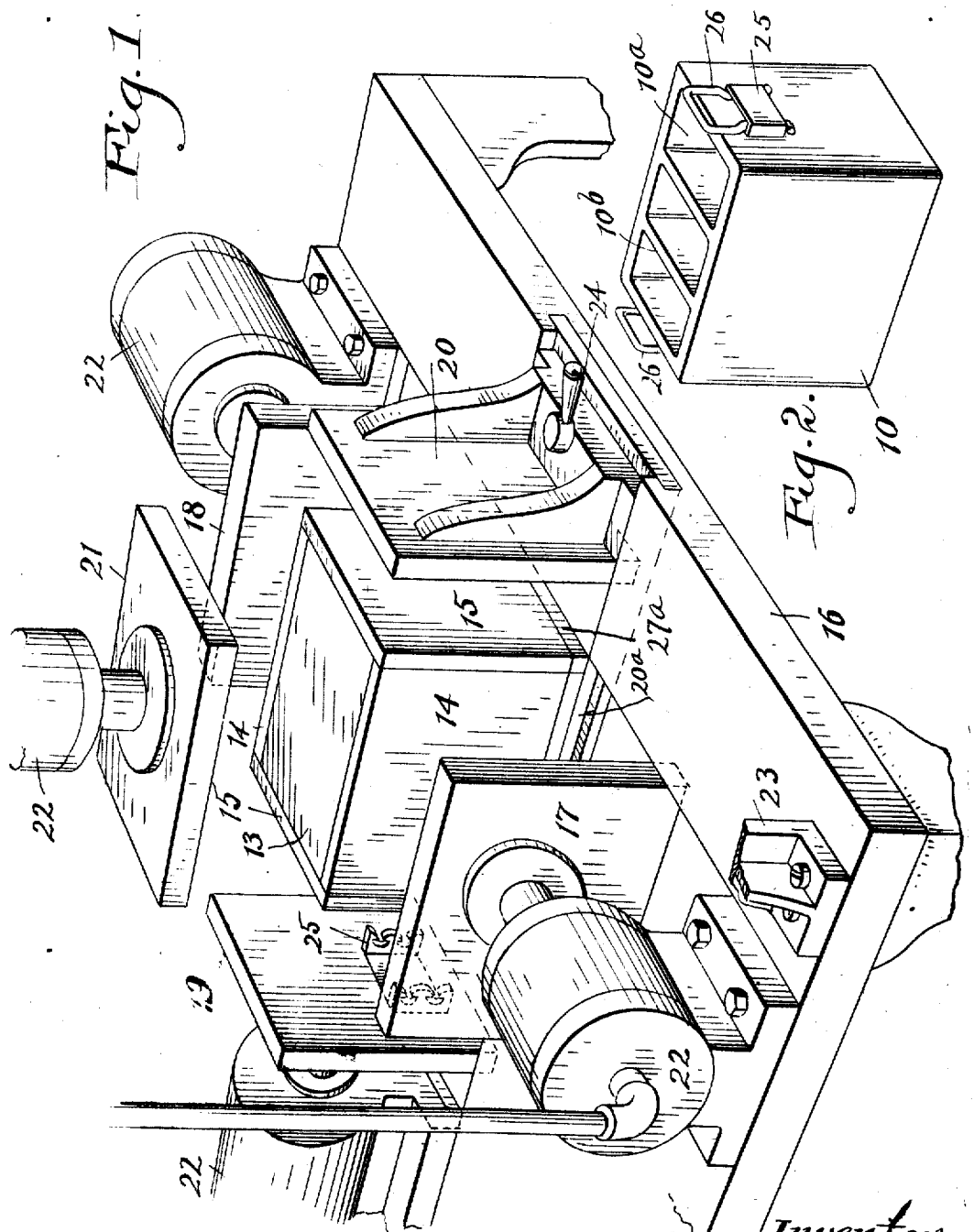

T. A. WILLARD.
METHOD OF MAKING STORAGE BATTERY CONTAINERS.
APPLICATION FILED FEB. 11, 1921.
1,421,748.
Patented July 4, 1922.
2 SHEETS—SHEET 2.
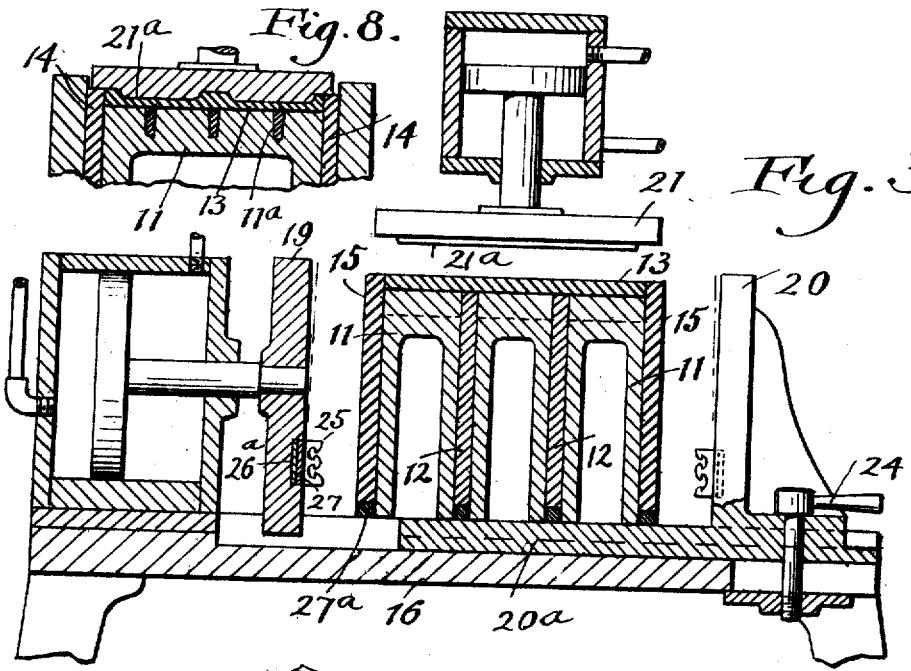
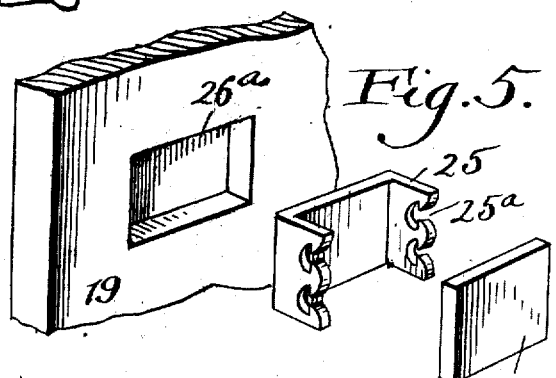
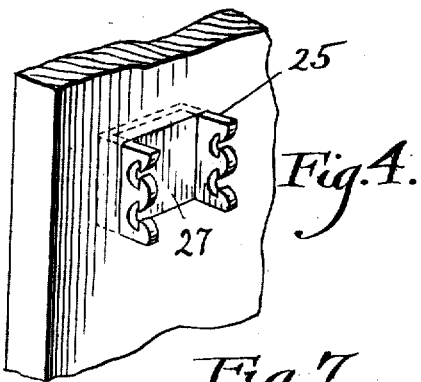
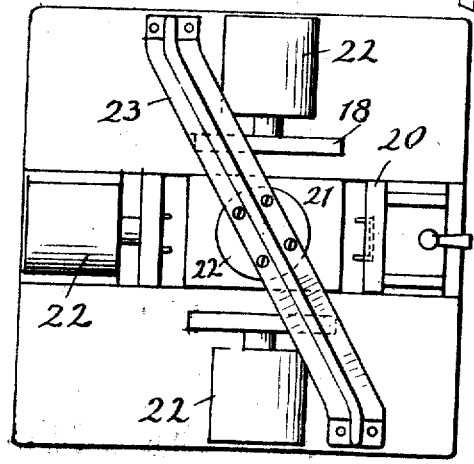
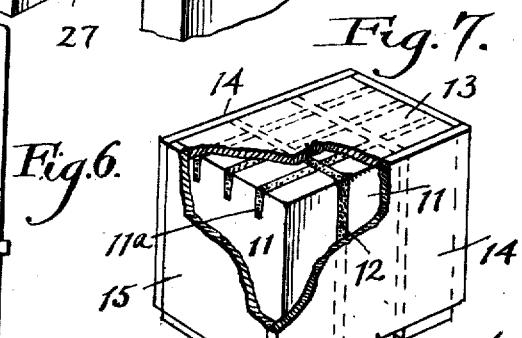

UNITED STATES PATENT OFFICE.

THEODORE A. WILLARD, OF CLEVELAND HEIGHTS, OHIO.

METHOD OF MAKING STORAGE-BATTERY CONTAINERS.

1,421,748.  Specification of Letters Patent.  Patented July 4, 1922.

Application filed February 11, 1921. Serial No. 444,249.

*To all whom it may concern:*

Be it known that I, THEODORE A. WILLARD, a citizen of the United States, residing at Cleveland Heights, in the county of Cuyahoga and State of Ohio, have invented a certain new and useful Improvement in Methods of Making Storage-Battery Containers, of which the following is a full, clear, and exact description.

This invention relates to a method of forming hard rubber storage battery containers, and is an improvement on the method described and claimed in my prior Patent No. 1,352,161.

In accordance with the method disclosed in my patent above referred to, a jar is formed by placing rubber in sheet form around the sides and over the end of a core or mandrel, then squeezing the rubber up against the sides and end of the core, this being preferably accomplished through the medium of plungers by which pressure is applied at right angles to, and entirely over each rubber covered face of the core, and then vulcanizing the jar on the core.

The present invention relates particularly to a method of forming a multi-compartment jar or container by my prior patent and preferably, though not necessarily, by a machine constructed along the lines of that disclosed in my prior Patent No. 1,207,673, granted Dec. 5, 1916, for machine for making storage battery jars and the like.

In another aspect the invention relates to a method of applying handle inserts to opposite sides or faces of the container, preferably in the squeezing or pressing step.

Still further, the invention relates to an improved way of applying the pressure so as to work the air out from between the sheet rubber and sides of the core or cores, and prevent the formation of imperfect jars by the trapping of air between the rubber and the core surfaces which the rubber engages.

The invention may be briefly summarized as consisting in certain novel steps and combinations of steps of the improved method which will be described in the specification and set forth in the appended claims.

In the accompanying sheets of drawings, wherein I have shown the manner of carrying out the principal steps of my method, Fig. 1 is a perspective view of the major portion of a press which may be employed advantageously, the plungers of the press being retracted, and there being on the bed, ready for the compression stroke, a rubber and core assembly including a plurality of cores between which and over the bottom and around the sides of which, rubber has been placed for the formation of a multi-compartment container; Fig. 2 is a perspective view of the finished container; Fig. 3 is a transverse sectional view through the machine and through the core and rubber assembly which is to be compressed therein; Fig. 4 is a perspective view looking toward the inner face of one of the plungers to which a handle insert has been applied to be inserted in the soft rubber forming one end of the container; Fig. 5 is a similar view, but with the plunger, insert and a filler block employed therewith separated; Fig. 6 is a top plan view of a machine on a reduced scale; Fig. 7 is a perspective view of the core and rubber assembly ready to be placed in the press, portions of the rubber sheets being broken away; and Fig. 8 is a transverse sectional view through the upper part of the assembly and plungers, this section being taken at right angles to the section of Fig. 3.

In applying the method of my prior Patent No. 1,352,161, and as specifically disclosed therein, single compartment jars were formed, but in accordance with the present improved method, a multi-compartment container such as shown at 10 in Fig. 2 is produced, this container having side, end and bottom walls, and a number of compartments 10ᵃ separated by vertical partitions 10ᵇ, the whole formed in one integral body or unit from plastic, uncured rubber, which after the compressing step is vulcanized to harden the rubber and thoroughly cement all seams and joints.

The container may have any number of compartments 10ᵃ, but for convenience I have shown a three-compartment container.

In forming this container a plurality of metal cores 11 are utilized, one for each compartment, each core being similar to the cores utilized in forming the single compartment jars. That is to say, they are rectangular in shape and are preferably hollowed out for the sake of lightness. Each core, as in the case with the cores used in forming ordinary single compartment jars, is provided at the bottom with transverse tapered slots into which strips 11ᵃ of rubber are driven to form upstanding bridges at the bottom of each compartment of the container to support the battery elements.

In forming the core and rubber assembly to produce a multi-compartment container, the necessary number of cores are placed side by side and separated by sheets of rubber 12, previously rolled to the right thickness and cut to the right dimensions, the length and width of each rubber sheet 12 corresponding to the dimensions of the side faces of the core. As will be readily understood, the cores 11 form the compartments 10ᵃ of the container 10 of Fig. 2, and the sheets 12 separating the cores, form the partitions 10ᵇ which separate the compartments. Prior to assembling the cores and intervening rubber sheets 12, the cores, of both the cores and sheets are painted with rubber cement, and then the cores and sheets 12 are assembled as shown in Fig. 7, and tightly squeezed together.

The core and rubber assembly is completed by a sheet 13 of rubber which covers the bottom faces of the cores and is adapted to form the bottom of the container, also by sheets 14 of rubber adapted to form the sides of the container and by sheets 15 which are laid over the sides of the endmost cores and adapted to form the ends of the container, all these sheets being coated with rubber cement before being applied.

I do not regard it essential as to which of the sheets 11, 14 and 15 overlap the edges of the other, nor do I regard it essential to my invention that the sides and ends be formed by separate pieces of rubber. Separate pieces are preferably employed and placed about the assembly of cores as shown and explained above, because of the difficulty in handling larger sheets, but it may be practicable to envelop the cores with a single sheet of rubber to form the sides and ends of the container, or with two pieces instead of the four as here shown.

After the core and rubber assembly necessary to make a multi-compartment container is made up in the manner above explained, the whole assembly is tightly squeezed together so as to close all seams or joints, and cause the rubber to adhere closely to the cores. For this purpose I prefer to employ a press substantially like that illustrated in my prior Patent No. 1,207,673, above referred to, and having a horizontal bed 16, provided with a pair of oppositely disposed power operated plungers 17 and 18 for compressing opposite sides of the core and rubber assembly, a power operated plunger 19, and a normally stationary abutment or plate 20 oppositely disposed with respect to one another, and adapted to compress the other two sides, or rather the ends of the assembly, and an upper power operated plunger 21 for exerting pressure down on the assembly. The inner or compressing faces of all plungers except the upper plunger 21 are preferably flat, but the plunger 21 has on its lower face ribs or projections 21ᵃ for a purpose to be explained.

The plungers 17, 18, 19 and 21 are preferably hydraulically operated, though other motive fluid by which sufficient power can be exerted can be utilized, and therefore these plungers are connected to pistons operating in fluid pressure cylinders 22. The cylinders which operate the plungers 17, 18, and 19, which have an inward horizontal movement, are supported directly on the bed, while the cylinder for operating the upper plunger 21 vertically, may be supported on a yoke such as shown at 23 in Fig. 6, and a portion of which is shown in Fig. 1.

The normally stationary plate or abutment 20 is moved in and out along a guideway of the bed by hand, and is locked in position by a movable locking device 24. The abutment 20 is preferably provided with an inwardly extending tongue or slide 20ᵃ on which the core and rubber assembly is supported during the compressing or squeezing operation. It might here be mentioned that the slide 20ᵃ and abutment 20 as shown in Figs. 1 and 3 are not in the inward positions which they occupy during the compressing step of the process, as will be explained subsequently.

At this point I will refer to an important feature of the invention, namely, the application of handle inserts to the soft rubber forming the ends of the container during the compression step. To make clear the utility and importance of this part of the invention, it may be stated that when a battery employing ordinary single compartment jars is made up, the jars are inserted and sealed in a wooden battery box to which handles are fastened for convenience in handling the battery. However, a multi-compartment container such as produced by the present method does away with the necessity for the outside wooden box, so that it becomes desirable that handles be attached to the ends of the container.

Due to the fact that this multi-compartment container is formed of rubber, which after vulcanization is exceedingly hard, handles can not be applied and fastened to it in the same manner that they are applied and fastened to a wooden battery box, and it becomes desirable that they be applied by being partly embedded in the rubber while in a soft unvulcanized state. This is accomplished by my invention in the compressing step utilized in forming the container.

The particular form or design of the handle which is applied is immaterial to this feature of my invention. It may be a complete handle having a hand-hold portion, or it may simply be a part which is embedded in the rubber to receive the handle proper.

This last is preferred, especially as it admits of the replacement of the handle proper should it become broken or corroded by acid.

A further reason that I prefer a two-part handle consisting of an insert embedded in the rubber and a handle member attached to it, is that in practice the handle should project above the top of the container, and should it be formed in one piece and project above the top of the container, it would interfere with the application of pressure on the container in the process of manufacturing it, and also render difficult the truing of the top of the container by a grinding process which at times is necessary. Therefore, in Fig. 1 the container 10 is shown as provided with handle inserts in the form of U-shaped straps 25 whose ends are embedded in the ends of the container, and which project outwardly therefrom so as to permit a handle proper 26 to be applied thereto. The handle proper, in this instance is in the form of a U-shaped piece of wire or rod whose ends are inserted down between the strap and the ends of the container and allowed to spring apart so as to be retained, in the strap, the extreme ends being bent laterally so as to act as shoulders preventing the accidental withdrawal of the handle.

For the purpose of applying the inserts 25, the inner faces of the plunger 19 and plate or abutment 20 are provided with rectangular recesses 26 (see particularly Fig. 5) for these inserts. When the straps are inserted in the recesses 26ᵃ, the ends of the straps, which as will be observed particularly from Figs. 4 and 5 are provided with undercut or dovetail notches 25ᵃ, project inwardly beyond the inner faces of the plunger 19 and plate 20. I then insert between the legs or ends of the insert a filler block 27, preferably of wood, so that the surface between the projecting ends of the insert is flush with the remainder of the compressing surface of the plunger 19 or abutment 20.

To form a multi-compartment jar such as shown in Fig. 2, the core and rubber assembly, such as shown in Fig. 7, is made up outside of the press, and after the handle inserts have been positioned in the plunger 19 and abutment 20, the core and rubber assembly is placed on the tongue or slide 20ᵃ of the abutment 20, substantially as shown in Figs. 1 and 3, although to place the assembly on the slide, the abutment will be withdrawn further than shown in these figures. Then the core and rubber assembly is manually moved up against the upright face of the abutment or plate 20, and in so doing the ends of the insert carried by the abutment are inserted in the soft rubber. Then the slide and abutment 20 and the assembly carried by the slide are moved inward to compressing position, and the abutment and slide are locked in place by the locking device 24. Then the valve or valves are operated to actuate the plungers, causing the core and rubber assembly to be very tightly compressed on all five of the rubber covered faces. It is immaterial whether the plungers are actuated simultaneously or successively, though as the process is carried out by me in practice, the plunger 19 engages the assembly and forces it tightly up against the abutment 20 at about the same time, or just before the plungers 17 and 19 come up to and squeeze the sides of the assembly, after which the plunger 21 comes down on the assembly and squeezes it very firmly between the plunger 21 and the slide 20ᵃ. The pressure which in practice is very severe, is allowed to remain simultaneously on all the rubber covered faces of the assembly for a brief instant before it is released, causing the complete union of all seams or joints. When the assembly is squeezed between the plunger 19 and abutments 20 carrying the handle inserts, the ends of the inserts are firmly embedded in the end walls of the container, and under the compression, the rubber will fill the undercut notches on the ends of the inserts. After the squeezing or compression of the assembly the plungers are retracted, and the container with the handle inserts now embedded in its ends is ready for vulcanization.

At this point I wish to mention that it is important that the air be forced out from between the sheets of rubber and the faces of the cores which they engage to avoid causing the air to be trapped between the rubber and the cores which would result in the formation of defective jars. To avoid this I cause the air to be squeezed from between the rubber and the cores, and cause it to be forced out at the open end of the container by an excess of pressure on the rubber forming the lower part of the upright walls of the container over that forming the upper part of the container, or by a more or less progressive squeezing action from the region forming the lower part of the container to that forming the upper part of the side walls. This can be done by attaching the pistons or the rods extending from the pistons to the plungers 17, 18 and 19, above the centers of these plungers so that the pressure is applied above the centers of the plungers. This is the expedient that I have shown in Figs. 1 and 3. Or I may have the faces of the plungers 17, 18 and 19, and abutment 20 on a slight taper as indicated in exaggerated fashion by the dot and dash lines in Fig. 3. This expedient I have also employed advantageously. In either event the pressure is slightly greater on the upright sides adjacent the bottom or closed end of the container than in the regions adjacent the open end of the container, and there is, in effect, a progressive action which effectively squeezes or wipes out the air which is expelled at the open end of the container.

In describing my process in connection with the drawings, the assembly is described as having its closed end up and open end down, and it is so illustrated in the drawings. However, I do not wish to be limited to this manner of placing the assembly in the press, for it can be placed in the press with the closed side down and open side or top up. In such event, in order to effectively squeeze out the air the pistons will be connected to the plungers below their centers, and if the expedient of tapering the inner faces of the plungers and stationary abutment is also utilized, the taper would be the reverse of that indicated by the dot and dash lines of Fig. 3; that is to say, the lower portions of the plungers would be somewhat closer together than their upper portions.

In Fig. 3 the lower or open ends of the cores project downwardly somewhat below the lower edges of the sheets placed between and around the cores, and I therefore insert beneath the edges of the sheets, metal filler strips 27 so as to prevent the rubber being squeezed down too far. These pieces 27 which are preferably utilized whenever the cores protrude beyond the rubber sheets, may be in the form of separate pieces, or may be in the form of an open frame. In any event, the width of these pieces are not such as to obstruct the action of the plungers in squeezing the rubber laterally inward.

In describing the plunger 21, reference was made to the fact that it is provided on its lower face with ribs 21ª which are illustrated both in Figs. 3 and 8. On the compressing stroke of the plunger 21 these ribs enter the rubber sheet 13, forming the bottom of the container, causing two shallow grooves to be produced in this sheet, and forcing the marginal portions of the sheet 13 solidly against the overlapping portions of the sheets 14 and 15. This I have found is useful in eliminating the possibility of a leak occurring in any part of the bottom of the jar, and if found desirable, the same expedient can be utilized on the plungers which compress the upright sides of the container so as to securely force the rubber together when the marginal portions of the sheets 14 and 15 overlap.

Following the compression step, the plungers are retracted as already stated, and then the slide 20ª and the abutment 20 are pulled outward, withdrawing the now compressed assembly. The assembly is then removed from the press and vulcanized in a suitable vulcanizer with the rubber still surrounding the cores until the container is cured to the proper degree. Then the cores are stripped from the container, the top edge of the latter is trued, if necessary, by grinding, the filler blocks or inserts 27 are knocked out from behind the metal inserts 25, and after the handles 26 are applied, the container is ready for use.

Inasmuch as the uncured rubber is very sticky, the sheet 13 forming the bottom of the container, and the sheets 14 and 15 are preferably covered with thin sheet tin for the purpose of preventing the rubber sticking to the plungers when they are retracted, and also for the purpose of imparting a black, shiny finish to the container during vulcanization. If the rubber forming the container is surfaced with tin, suitable slots will be cut in the tin which covers the ends of the assembly to permit the entrance into the rubber of the handle inserts.

I may, if desired, compress the assembly in the presence of heat by steam heating or electrically heating the plungers and the plate or abutment 20, but the means for heating these parts, and numerous other details of the press are not herein illustrated as the present invention does not reside in the press or apparatus for carrying out the method.

In the compressing step above explained, not only are the sheets forming the outer walls of the container firmly and properly united to one another and to the transverse rubber sheets forming the partitions, but the rubber sheets forming the partitions and the ends of the container are also similarly united to the bridge forming inserts in the slots at the lower ends of the cores, and after vulcanization the container is in effect formed of one unitary body of rubber with all parts integral or integrally united, and with scarcely any possibility of leaky containers being formed.

Furthermore, it will be apparent that by rounding off the edges of the cores, each compartment may have rounded fillets at its inner corner edges, while at the same time the four outer or vertical edges of the container are reinforced by an increased amount of material which could not be provided in a hand rolled container.

In conclusion it might be stated that by the present method, not only are containers formed which are strong and virtually proof against acid leakage, but containers can be formed less expensively than by any other method of which I am aware, and furthermore, the loss due to defective or improperly formed containers is minimized, especially by reason of the manner in which pressure is applied directly to all the outside faces of the assembly as well as indirectly to the inner rubber covered faces of adjacent cores; also to the manner in which the inserts are applied and thoroughly embedded in the rubber during the compressing step, and to the fact that air is squeezed out between the rubber and the cores by progressive application of pressure from the bottom to the top of the container, or the excess pressure at the bottom of the container over that at the top.

Having described my invention, I claim:—

1. The method of forming a multi-compartment hard rubber storage battery container which comprises placing uncured rubber in sheet form between a series of cores, placing uncured rubber in sheet form about the sides and over the bottom ends of the cores and the intervening layers of rubber so as to form a core and rubber assembly, applying pressure laterally and vertically to the sides and top and bottom of the assembly, and vulcanizing the container after the compression step.

2. The method of forming a multi-compartment hard rubber storage battery container which comprises placing flat sheets of rubber between a number of cores arranged side by side, placing rubber about the sides and over the bottom ends of the cores so as to contact with the edges of the rubber sheets between the cores, applying pressure at right angles to the rubber covered faces of the core and rubber assembly, and vulcanizing the compressed container.

3. The method of forming a hard rubber multi-compartment storage battery container which comprises placing sheets of rubber between a plurality of adjacent flat cores, placing rubber in sheet form around the four sides and over the bottom ends of the assembled cores, causing pressure to be exerted simultaneously to the rubber covered surfaces of the assembly, and vulcanizing the compressed container.

4. The method of forming a hard rubber multi-compartment storage battery container which comprises placing sheets of rubber between a plurality of adjacent flat cores, placing rubber in sheet form around the four sides and over the ends of the assembly cores, causing pressure to be exerted simultaneously to the rubber covered surfaces of the assembly, releasing the pressure, and vulcanizing the compressed container in a vulcanizer.

5. The method of forming a hard rubber storage battery container which comprises forming a rubber and core assembly with plastic uncured rubber in sheet form around the exterior to form the sides and bottom of the container, compressing the assembly between oppositely disposed compressing members, and forcing handle inserts in the rubber during the compressing operation.

6. The method of forming a hard rubber multi-compartment storage battery container which comprises placing rubber in sheet form between a plurality of flat cores arranged side by side, placing uncured rubber in sheet form around the cores to form the upright sides of the container and over the ends of the cores to form the bottom of the container, exerting pressure on all rubber covered surfaces of the container between oppositely disclosed compressing members, and causing handle inserts to be embedded in the rubber forming two of the oppositely disposed sides of the container.

7. The method of forming a hard rubber storage battery container which comprises forming a rubber and core assembly with plastic uncured rubber arranged to form the bottom and upright side walls of the container, and applying pressure to the rubber covered faces, first to the rubber forming the lower part of the container and progressively to the top.

8. The method of forming a hard rubber storage battery container which comprises forming a rubber and core assembly with sheet rubber arranged so as to form the upright sides and bottom of the container, squeezing the assembly between pairs of oppositely disposed compressing members, and causing the air on the inner side of the rubber forming said sides to be gradually forced out along said sides from the lower part to the top of the container.

9. The method of forming a hard rubber storage battery container which comprises forming a rubber and core assembly with sheet rubber arranged so as to form the upright sides and bottom of the container, squeezing the assembly between oppositely disposed compressing members with greater pressure applied to the rubber forming the lower part of the container to that forming the top.

10. The method of forming a hard rubber storage battery container which comprises forming a rubber and core assembly with sheet rubber arranged to form the upright sides and bottom of the container, with the marginal portions of certain of the sheets overlapping, squeezing the assembly between pairs of oppositely disposed compressing members, and at the same time, causing a lateral displacement of part of the rubber of one sheet so as to bring it into firm engagement with the portion of an adjacent sheet overlapping its edge.

In testimony whereof, I hereunto affix my signature.

THEODORE A. WILLARD.